United States Patent [19]
Nash

[11] Patent Number: 5,363,876
[45] Date of Patent: Nov. 15, 1994

[54] FLOW CONTROL DEVICES

[75] Inventor: John V. Nash, Farnham, England

[73] Assignee: Kinetrol Limited, Surrey, United Kingdom

[21] Appl. No.: 109,093

[22] Filed: Aug. 19, 1993

[30] Foreign Application Priority Data

Sep. 2, 1992 [GB] United Kingdom ................ 9218593

[51] Int. Cl.$^5$ .............................................. G05D 7/01
[52] U.S. Cl. ..................................... 137/501; 137/504
[58] Field of Search ......................... 137/501, 503, 504

[56] References Cited

U.S. PATENT DOCUMENTS

| 2,637,339 | 5/1953 | Pease | 137/501 |
| 4,186,767 | 2/1980 | Caffrey | 137/501 |
| 4,497,341 | 2/1985 | Wright | 137/501 X |
| 4,513,777 | 4/1985 | Wright | 137/501 |
| 4,629,561 | 12/1986 | Shirato et al. | 137/501 |

FOREIGN PATENT DOCUMENTS

| 882569 | 6/1943 | France | 137/503 |
| 799024 | 7/1958 | United Kingdom . | |
| 939661 | 10/1963 | United Kingdom . | |

Primary Examiner—Stephen M. Hepperle
Attorney, Agent, or Firm—Hopgood, Calimafde, Kalil & Judlowe

[57] ABSTRACT

A fluid flow device for minimizing the effects of fluctuating pressures on the fluid flow rate has a variable restriction in the fluid path through the device arranged to produce a lesser restriction as the pressure difference between the inlet and outlet of the device increases, and vice versa. This first, variable restriction is formed by an inlet tube and a blocking member. A second, constant restriction for the fluid flow is formed by the tube and a parallel bore through which the tube extends, to produce a pressure drop which creates a pressure differential across a diaphragm balanced by a spring. A change of the pressure differential across the device also changes the pressure differential on the diaphragm, which is connected to the blocking member, so that movement of the diaphragm has the effect of varying the restriction in the manner described to reduce flow rate variations through the device.

19 Claims, 2 Drawing Sheets

FLOW CONTROL DEVICES

BACKGROUND OF THE INVENTION

This invention relates to devices for the control of a fluid flow.

Devices intended to control the flow rate of a continuous flow of fluid are known in the form of needle valves. Although such valves are widely used they have inherent problems because they operate at small fixed clearances. Not only can this complicate any initial adjustment, but it also leaves them sensitive to fluid pressure variations. In addition, the small clearances at which the valves must usually be set can easily become blocked by dirt or contamination.

In GB 939661 a control valve is disclosed which has variable and fixed orifices in series in the fluid flow path through the valve. The fixed orifice establishes a pressure differential between chambers on opposite sides of a piston. A spring acts on the piston to hold it in equilibrium against the pressure differential. Variations in pressure at the inlet or outlet of the device will tend to alter the pressure differential and displace the piston. Piston movement adjusts the variable orifice in a sense that restores the original pressure differential. As a result, the flow through the valve is kept substantially constant. It will be noted, however, that this device still relies on a fixed orifice and so is also prone to disturbance due to dirt or contamination. An analogous arrangement is described in U.S. Pat. No. 4,513,777.

SUMMARY OF THE INVENTION

According to one aspect of the present invention there is provided a fluid control device comprising means for a flow of fluid through said device between a supply connection and an outlet connection, first means for reducing the pressure of the fluid flow from said supply connection, further means for imposing an additional pressure reduction on the fluid flow between said first means and said outlet connection and for responding to variations of said additional pressure reduction by adjusting the first means in such a way as to lessen the pressure reduction by said first means in response to a falling tendency in said additional pressure difference, and vice versa, whereby to reduce variations of the rate of fluid flow due to variations in the pressure difference between said supply and outlet connections.

According to another aspect of the invention, there is provided a fluid flow control device comprising inlet means for admitting a pressure fluid to an intermediate space within the device past blocking means which reduce the pressure of the fluid flow into said space, a passage for the fluid flow from said intermediate space to a downstream region having a restricted cross-section whereby the flow rate therethrough is dependent on the pressure difference between said intermediate space and said downstream region, means responsive to the fluid pressure difference between said intermediate space and said downstream region being operable to cause a relative displacement between the inlet means and said blocking means in such manner that an increase of said fluid pressure difference increases the pressure reduction produced by said blocking means, and said passage being formed between opposed walls relatively movable parallel to each other with said displacement between the inlet means and blocking means, the arrangement being such that said variation of the pressure reduction effected by the blocking means tends to reduce variations in the flow rate due to changes of the fluid pressure difference between said inlet means and said downstream region.

More specifically, the device may comprise coaxial inlet and outlet conduits which are relatively displaceable axially of each other and which communicate with each other through the intermediate space which has a bounding wall lying close to the communicating end of the inlet conduit to form therewith a restriction reducing the pressure of the flow from the conduit, said wall being displaceable relative to the inlet conduit with changes of the pressure drop between the intermediate spaces and the outlet from the device to vary the spacing between said conduit and said wall, and the space between the coaxial conduits forming a flow passage between said restriction and the outlet providing a substantially constant restriction on the flow therethrough.

Means can be provided for adjustably setting the pressure-reducing blocking means of the device, whereby to change the rate of flow through the device.

The invention will be described in more detail by way of example with reference to the accompanying drawings.

DESCRIPTION OF THE PREFERRED EMBODIMENTS

Figure 1:
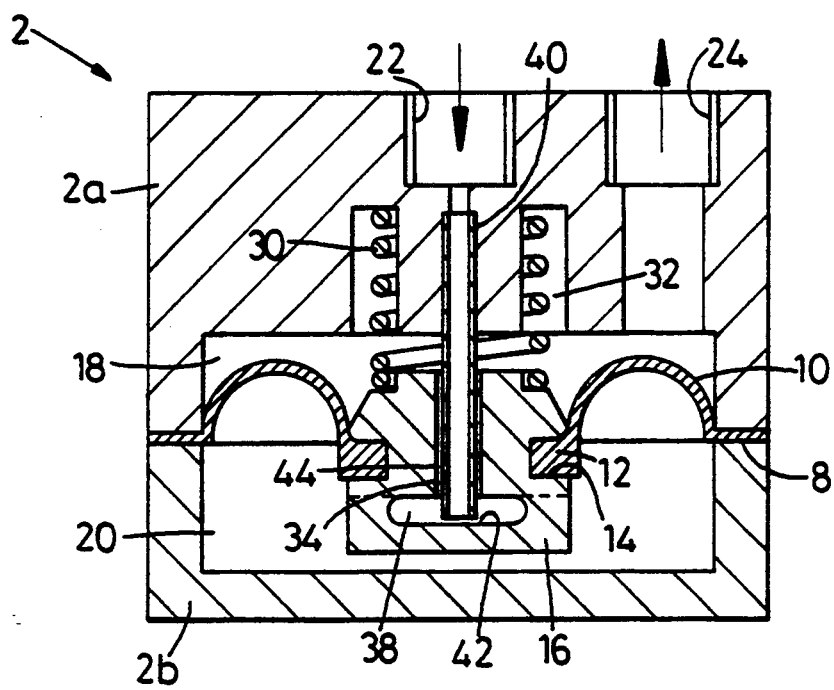
FIG. 1 is an axial section of a flow control device according to the invention.
Figure 2:
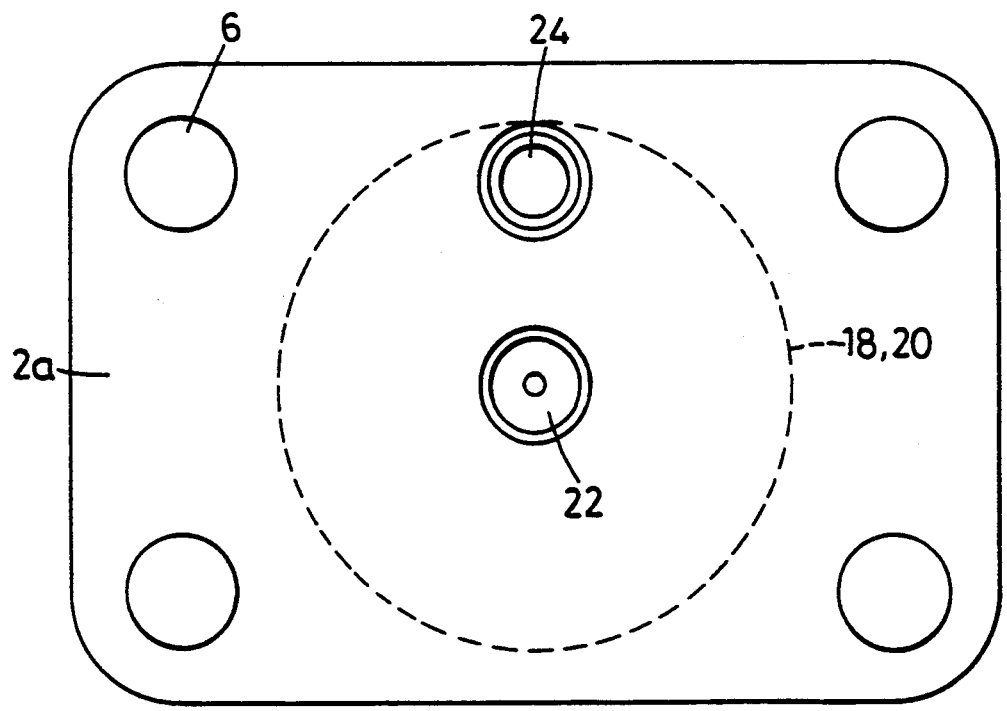
FIG. 2 is a plan view of the device in FIG. 1.

The main body 2 of the flow control valve illustrated in FIGS. 1 and 2 is formed by upper and lower parts 2a, 2b which enclose a cylindrical space. The two parts are located together by screws 6 to seal between them the outer rim 8 of a diaphragm 10, the inner rim 12 of which seals in an annular recess 14 in the periphery of a central boss 16 so that the cylindrical space between the body parts is divided into upper and lower chambers 18,20 separated by the diaphragm 10. The upper body part 2a has fluid inlet and outlet ports 22,24. The boss 16 is urged downwards by a regulator spring 30, compressed between a pocket 32 in the upper body part 2a and the boss 16. The fluid pressures in the upper and lower chambers 18, 20 act in opposition to each other on the diaphragm to give a resultant pressure force balancing the force of the spring 30.

The boss 16 has a central bore 34 which extends from its upper end to a cavity 38 within the boss and open to the main volume of the lower chamber. A tube 40 secured in the upper body part 2a projects from the inlet port 22 coaxially into the bore 34 and terminates close to the bottom wall 42 of the cavity 38. A narrow annular passage 44 between the tube 40 and bore 34 communicates between the cavity and the upper chamber 18, which is open to the outlet port 24. Pressure fluid admitted through the inlet port 22 is directed through the tube 40 into the cavity 38 and the flow is strongly throttled by the small gap that exists between the tube and the cavity bottom wall 42, the latter thus functions as a blocking member. The flow leaves the cavity by way of the annular passage 44 between the tube and the bore 34 where it undergoes a further but considerably smaller pressure drop. It may be noted that while displacement of the boss 16 by the action of the diaphragm 10 and spring 30 will vary the restriction between the tube 40 and wall 42, because the boss is displaced coaxially to the annular passage, its movement will leave unaltered the restriction offered by the annular passage 44 where the bore 34 and tube 40 move parallel to each other.

If the pressure in the upper chamber 18 increases relative to that in the lower chamber 20, the diaphragm 10, and therefore the boss 16, is displaced downwardly so opening the gap between the tube 40 and the cavity bottom wall 42. The throttling effect on the flow at the tube exit is therefore reduced and the pressure in the lower chamber 20 increases, tending to restore the pressure differential between the ends of the annular passage 44. Conversely, a drop of pressure in the upper chamber relative to the lower chamber narrows the gap between the tube and the bottom wall and the pressure differential tends to be restored by the consequent reduction of the pressure at the inlet to the annular passage.

Thus, when changes of inlet or outlet pressure occur, the pressure values at entry and exit of the passage 44 vary in the same sense, and the pressure drop between the ends of the passage can be very substantially reduced. Because the movements of the boss leaves the geometry of the passage unchanged, in particular its length remains constant, the device tends to maintain a constant rate of flow when variations of the inlet or outlet pressures are experienced. In particular, the device allows a substantially uniform flow to be obtained from an unregulated pressure supply.

Changes of inlet pressure and variations in the gap between the tube and the cavity bottom wall will both produce a varying pressure on that bottom wall. Because of the very small area over which the variation of pressure acts, however, the effect is negligible in comparison with the variations in the pressure differential acting on the diaphragm.

It is a feature of the described device that it is less easily blocked by dirt or contamination than the conventional fixed needle valve which it can replace. This is primarily because of the manner in which the boss is displaced to correct for changing pressure conditions. The regions of smallest cross-section flow path, that is at the entry to the cavity and in the annular passage are formed by relatively movable surfaces and the continual adjustment taking place between those surfaces will tend to prevent foreign matter becoming lodged in those regions. The device is therefore suitable for low flow rate applications, although its usefulness is not so limited.

It will be understood from the foregoing description that precise coaxiality between the bore 34 and tube 40 is not essential for the satisfactory operation of the device.

Figure 3:
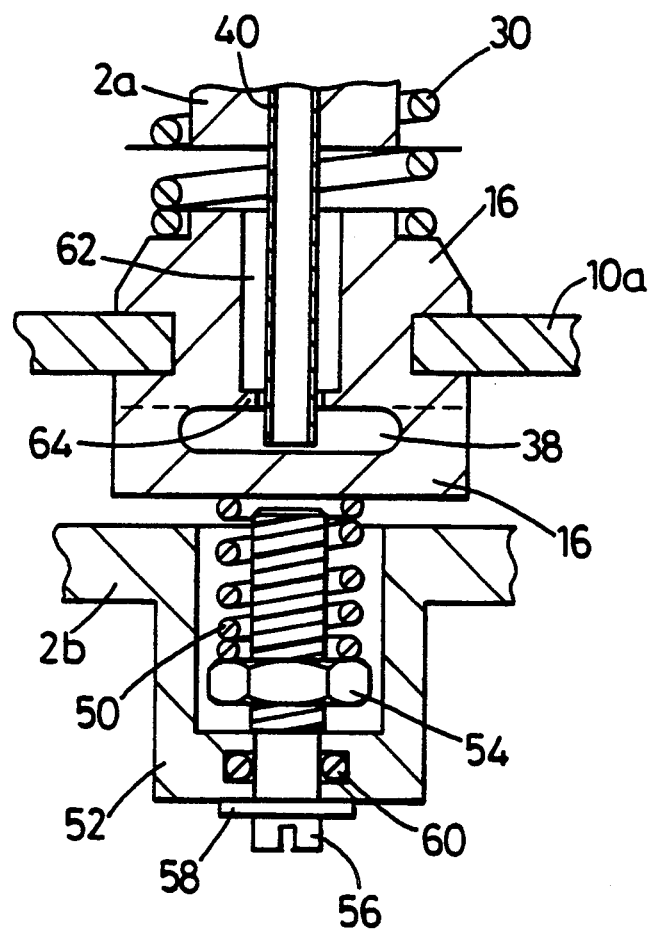
FIG. 3 is a detail of a section similar to FIG. 1 showing modifications of the device in FIGS. 1 and 2.

The set flow rate of the device can be chosen simply by selection of the spring 30. If desired, it is possible to provide an adjustable flow rate device by providing a second spring that is adjustable and that acts in opposition to a stronger version of the spring 30. An example of this modification is shown in FIG. 3 where the second spring 50 is located in a pocket 52 in the lower wall part 2b to bear on the boss 16 from below. The spring is supported by a nut member 54 threaded onto an adjusting screw 56 that is held captive in the bottom wall of the pocket by circlip 58 and sealed in that bottom wall by an O-ring 60. The nut member 54 is held non-rotatably by the side walls of the pocket 52 so as the screw 56 is rotated it rises or falls, varying the pressure of the spring 50 on the boss 16.

FIG. 3 illustrates a further modification which may be adopted independently of the flow rate adjustment means. In this modification the plain bore 34 is replaced by a stepped bore 62 which comprises short smaller diameter portion 64 forming a restricting orifice coaxial with the tube 40. It is found that such an arrangement can give better flow control because it reduces the effect of any viscosity variations in the fluid flow.

Yet another independent modification shown in FIG. 3 is the use of piston 10a in place of the flexible diaphragm 10 as a displaceable partition between the chambers 18,20.

The device can be produced as a separate unit or it can be integrated into a larger pneumatic or hydraulic unit. It may be utilized, for example, to give constant low air bleeds to I/P converters, or to pilot valves of the flow-sensitive flapper-and-nozzle type. However, its potential low cost and simplicity allow the device to be used in a much wider range of applications than this for the control of both liquid and gas flows.

I claim:

1. A fluid flow control device comprising inlet means for admitting a pressure fluid, a flow path through the device for said fluid and an outlet communicating with the flow path for the exit of said fluid from the device, said flow path comprising an intermediate space, blocking means in said flow path for reducing the pressure of the fluid flow into said space, the flow path further comprising a restricted cross-section passage for the fluid flow from said intermediate space to a downstream region whereby the flow rate through said passage is dependent on a pressure difference between said intermediate space and said downstream region, means responsive to said fluid pressure difference for causing a relative displacement between the flow path and said blocking means in such manner that an increase of said fluid pressure difference increases the pressure reduction produced by said blocking means and vice versa, whereby said variation of the pressure reduction effected by the blocking means tends to reduce variations in the flow rate due to changes of the fluid pressure difference between said inlet means and said downstream region, a pair of members having opposed walls forming said passage and said opposed walls being relatively movable parallel to each other with said relative displacement.

2. A fluid flow control device comprising:
   (i) a supply connection, an outlet connection and a fluid flow path between said supply and outlet connections,
   (ii) first means in said fluid flow path for reducing the pressure of the fluid flow from said supply connection,
   (iii) further means for imposing an additional pressure reduction on the fluid flow in the fluid flow path between said first means and said outlet connection,
   (iv) said further means being provided by inner and outer coaxial members, an annular gap being defined between said members which gap forms a restriction in the fluid flow path for said additional pressure reduction,
   (v) a control region in said fluid flow path between the first and second pressure reduction means,
   (vi) one of said coaxial members providing a fluid passage from the supply connection to said control region for effecting said first pressure reduction, (vii) a pressure sensitive member having opposite faces exposed respectively to the pressure in said control region and to the pressure downstream of said second restriction means, (viii) said pressure sensitive member being thereby responsive to the difference between the pressures on said opposite faces in order to adjust said first pressure reduction means in such manner that the first pressure reduction is lessened in response to a falling tendency in said additional pressure reduction and vice versa, whereby to reduce variations of the rate of fluid flow due to variations in the pressure difference between said supply and outlet connections.

3. A fluid flow control device comprising:
(i) a supply connection, an outlet connection and a fluid flow path between said supply and outlet connections,
(ii) first means in said fluid flow path for reducing the pressure of the fluid flow from said supply connection,
(iii) further means for imposing an additional pressure reduction on the fluid flow in the fluid flow path between said first means and said outlet connection,
(iv) said first means being adjustable in such manner that the first pressure reduction is lessened in response to a falling tendency in said additional pressure reduction, and vice versa, whereby to reduce variations of the rate of fluid flow due to variations in the pressure difference between said supply and outlet connections,
(v) said further pressure reduction means being provided by inner and outer coaxial members, an annular gap being defined between said members which gap forms a restriction in the fluid flow path,
(vi) said coaxial members being relatively displaceable axially of each other with said adjustment of the first pressure reduction means, and
(vii) said annular gap having a length which remains unchanged with said relative displacement of the coaxial members.

4. A fluid flow control device comprising:
(i) a supply connection, an outlet connection and a fluid flow path between said supply and outlet connections,
(ii) a control space in said path intermediate said connections,
(iii) first means in said fluid flow path to the control space for reducing the pressure of the fluid flow from said supply connection,
(iv) further means for imposing an additional pressure reduction on the fluid flow in the fluid flow path between said first means and said outlet connection,
(v) said further pressure reduction means being provided by inner and outer coaxial members, an annular gap being defined between said members which gap forms a restriction in the fluid flow path,
(vi) at least one of said coaxial members providing a fluid passage in said fluid flow path from the supply connection to said control space,
(vii) a blocking element in said control space, said at least one said coaxial member terminating adjacent said blocking element,
(viii) said coaxial member and said blocking element being relatively movable to produce changes in the magnitude of said first pressure reduction in such manner that the first pressure reduction is lessened in response to a falling tendency in said additional pressure reduction, and vice versa, whereby to reduce variations of the rate of fluid flow due to variations in the pressure difference between said supply and outlet connections.

5. A fluid flow control device comprising:
(i) a supply connection, an outlet connection and a fluid flow path between said supply and outlet connections,
(ii) first means in said fluid flow path for reducing the pressure of the fluid flow from said supply connection,
(iii) further means for imposing an additional pressure reduction on the fluid flow in the fluid flow path between said first means and said outlet connection,
(iv) pressure-sensitive means responsive to variations in said additional pressure reduction and connected to an element of the first pressure reducing means for adjustment thereof in response to said variations in such manner that the first pressure reduction is lessened in response to a falling tendency in said additional pressure reduction and vice versa, whereby to reduce variations of the rate of fluid flow due to variations in the pressure difference between said supply and outlet connections,
(v) said further pressure reduction means being provided by inner and outer coaxial members between which an annular gap is defined which forms a restriction in the fluid flow path,
(vi) the supply connection communicating with a control space in said fluid flow path through the inner of said coaxial members,
(vii) said first pressure-reducing means comprising a blocking element in said control space, said at least one coaxial member terminating adjacent said blocking element whereby said element acts to restrict the flow through said inner coaxial member into the control space,
(viii) said pressure-sensitive means comprising a displaceable member to which said blocking element is secured and which is located between the control space and the outlet connection for responding to pressure differentials therebetween, thereby to cause displacement of the blocking element relative to said inner coaxial member for said adjustment of the first pressure reducing means.

6. A device according to claim 1, wherein said coaxial members are relatively displaceable axially of each other with said adjustment of the first pressure reduction means.

7. A device according to claim 6, wherein the length of said annular gap remains unchanged with said relative displacement of the coaxial members.

8. A device according to claim 3, wherein said annular gap is provided by an orifice.

9. A device according to claim 3, wherein said annular gap is provided by an elongate annular passage.

10. A device according to claim 3, wherein the supply connection communicates with a control space in said fluid flow path through the inner of said coaxial members and the first pressure-reducing means acts to restrict the flow through said inner coaxial member into the control space.

11. A device according to claim 3, wherein at least one of said coaxial members provides a fluid passage from the supply connection to a control space for effecting said first pressure reduction.

12. A device according to claim 11, comprising a blocking element in said control space, said at least one coaxial member terminating adjacent said blocking element, and changes in the magnitude of said first pressure reduction are produced by relative movement between said coaxial member and said blocking element.

13. A device according to claim 11, wherein the inner coaxial member provides a part of the fluid flow path from the supply connection leading to the control space, and said annular gap between the coaxial members provides a further part of said fluid flow path from the control space to the outlet connection.

14. A device according to claim 3, comprising pressure-sensitive means responsive to variations in said additional pressure reduction and connected to an element of the first pressure reducing means for said adjustment thereof in response to said variations.

15. A device according to claim 3, comprising pressure-sensitive means responsive to variations in said additional pressure reduction and connected to an element of the first pressure reducing means for said adjustment thereof in response to said variations, and wherein the supply connection communicates with a control space in said fluid flow path through the inner of said coaxial members and the first pressure-reducing means acts to restrict the flow through said inner coaxial member into the control space, said pressure-sensitive means being located between the control space and the outlet connection for responding to pressure differentials therebetween.

16. A device according to claim 15 comprising a blocking element in said control space, said at least one coaxial member terminating adjacent said blocking element, and changes in the magnitude of said first pressure reduction are produced by relative movement between said coaxial member and said blocking element, and said pressure sensitive means comprises a displaceable member and the blocking element is secured to said displaceable member for displacement therewith to vary the restriction.

17. A device according to claim 15, the pressure-sensitive means comprises a diaphragm dividing the control space from the outlet connection.

18. A device according to claim 14, comprising resilient means acting against a pressure differential produced by said further pressure-reducing means whereby to determine a setting of the pressure-sensitive means controlling said first pressure reduction.

19. A device according to claim 18 comprising means for adjustment of the force of said resilient means in order to adjust the fluid flow rate.

* * * * *